United States Patent
Bailey

(10) Patent No.: US 12,291,467 B2
(45) Date of Patent: May 6, 2025

(54) ANTIMICROBIAL APPARATUS FOR TUBING

(71) Applicant: Hubbell Incorporated, Shelton, CT (US)

(72) Inventor: Christopher Lane Bailey, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 181 days.

(21) Appl. No.: 18/091,103

(22) Filed: Dec. 29, 2022

(65) Prior Publication Data

US 2023/0143746 A1 May 11, 2023

Related U.S. Application Data

(62) Division of application No. 17/156,093, filed on Jan. 22, 2021, now Pat. No. 11,565,950.

(60) Provisional application No. 62/965,378, filed on Jan. 24, 2020.

(51) Int. Cl.
  *C02F 1/32* (2023.01)
  *A47J 31/60* (2006.01)

(52) U.S. Cl.
  CPC .............. *C02F 1/325* (2013.01); *A47J 31/60* (2013.01); *C02F 2201/3224* (2013.01); *C02F 2303/22* (2013.01); *C02F 2307/10* (2013.01); *C02F 2307/12* (2013.01)

(58) Field of Classification Search
  CPC .............. C02F 1/325; C02F 2201/3224; C02F 2307/10; C02F 2307/12
  See application file for complete search history.

(56) References Cited

U.S. PATENT DOCUMENTS

| | | | |
|---|---|---|---|
| 4,899,057 A | 2/1990 | Koji | |
| 6,468,433 B1 | 10/2002 | Tribelski | |
| 7,270,748 B1 | 9/2007 | Lieggi | |
| 8,324,595 B2 | 12/2012 | Takahashi | |
| 2010/0224562 A1* | 9/2010 | Rolchigo | C02F 1/325 |
| | | | 210/243 |
| 2012/0085207 A1 | 4/2012 | Merle | |
| 2013/0330235 A1 | 12/2013 | Stibich et al. | |
| 2015/0129776 A1 | 5/2015 | Boodaghians et al. | |
| 2015/0314024 A1 | 11/2015 | Khan et al. | |
| 2016/0052802 A1 | 2/2016 | Ochi | |
| 2016/0198891 A1 | 7/2016 | Buttiker et al. | |
| 2020/0030473 A1 | 1/2020 | Sugimoto | |

FOREIGN PATENT DOCUMENTS

| WO | 2018/182569 A1 | 10/2018 |
|---|---|---|
| WO | 2018182569 | 10/2018 |

OTHER PUBLICATIONS

PCT/US2021/014680 International Search Report and Written Opinion dated Apr. 8, 2021 (14 pages).

(Continued)

*Primary Examiner* — Lessanework Seifu
(74) *Attorney, Agent, or Firm* — Robinson + Cole LLP

(57) ABSTRACT

A system including a tube for transferring fluid, a fiber optic cable that extends through an interior of the tube, and a light source configured to project high intensity narrow spectrum light into the fiber optic cable.

20 Claims, 10 Drawing Sheets

(56) References Cited

OTHER PUBLICATIONS

Notification of Transmittal of the International Search Report and the Written Opinion of the International Searching Authority (Forms PCT/ISA/220, PCT/ISA/210, and PCT/ISA/237) issued on Apr. 8, 2021, by the International Searching Authority in corresponding International Patent Application No. PCT/US2021/14680. (14 pages).

* cited by examiner

ANTIMICROBIAL APPARATUS FOR TUBING

RELATED APPLICATIONS

This application is a divisional of and claims priority to U.S. patent application Ser. No. 17/156,093, filed Jan. 22, 2021, which claims priority to U.S. Provisional Patent Application No. 62/965,378, filed Jan. 24, 2020. The entire contents of the aforementioned applications are hereby incorporated by reference.

FIELD

The present invention relates to an antimicrobial apparatus for tubing.

SUMMARY

Many consumer and commercial devices utilize tubing (e.g. plastic, glass, etc.) to transport liquids and gases intended for human exposure or consumption. Non-limiting examples of such consumer and commercial devices include coffee machines, ice machines, nebulizers, and vending machines. The tubing used in such devices may be susceptible to the development of harmful mold and bacteria, which may be inadvertently consumed by people using the devices.

In one aspect, the application provides a system including a tube for transferring fluid, a fiber optic cable that extends through an interior of the tube, and a light source configured to project high intensity narrow spectrum light into the fiber optic cable.

Other aspects of the invention will become apparent by consideration of the detailed description and accompanying drawings.

DETAILED DESCRIPTION

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Figure 1:
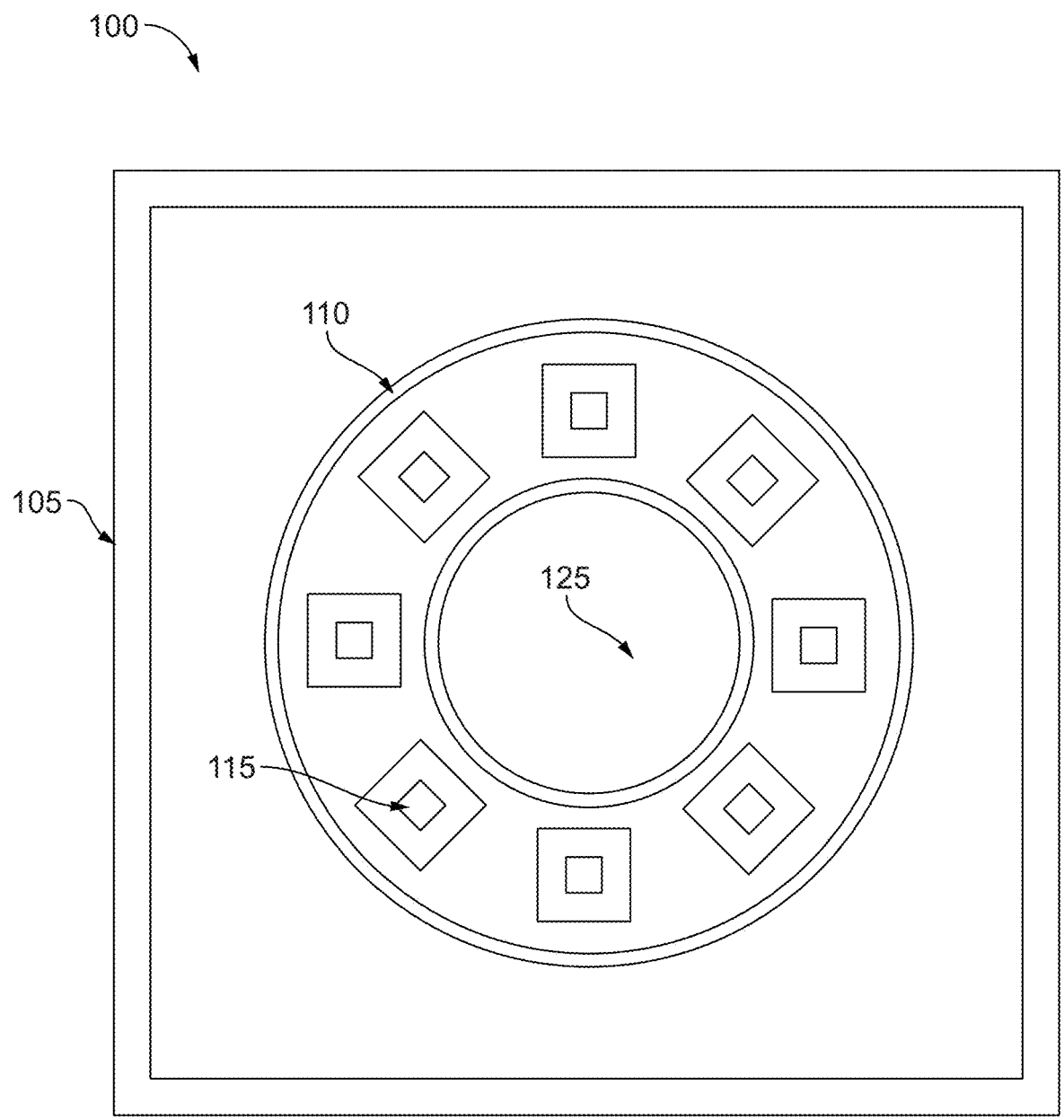
FIG. 1 is a front view of a lighting assembly according to one embodiment.
Figure 2:
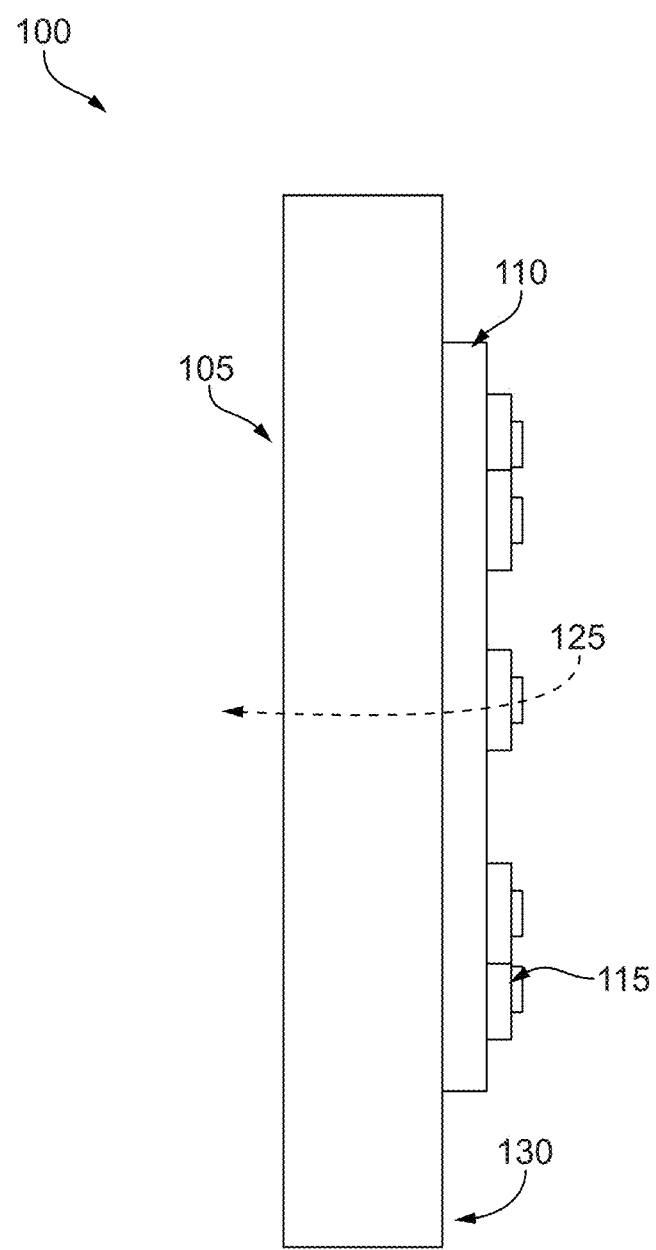
FIG. 2 is a side view of the lighting assembly illustrated in FIG. 1 according to one embodiment.
Figure 3:
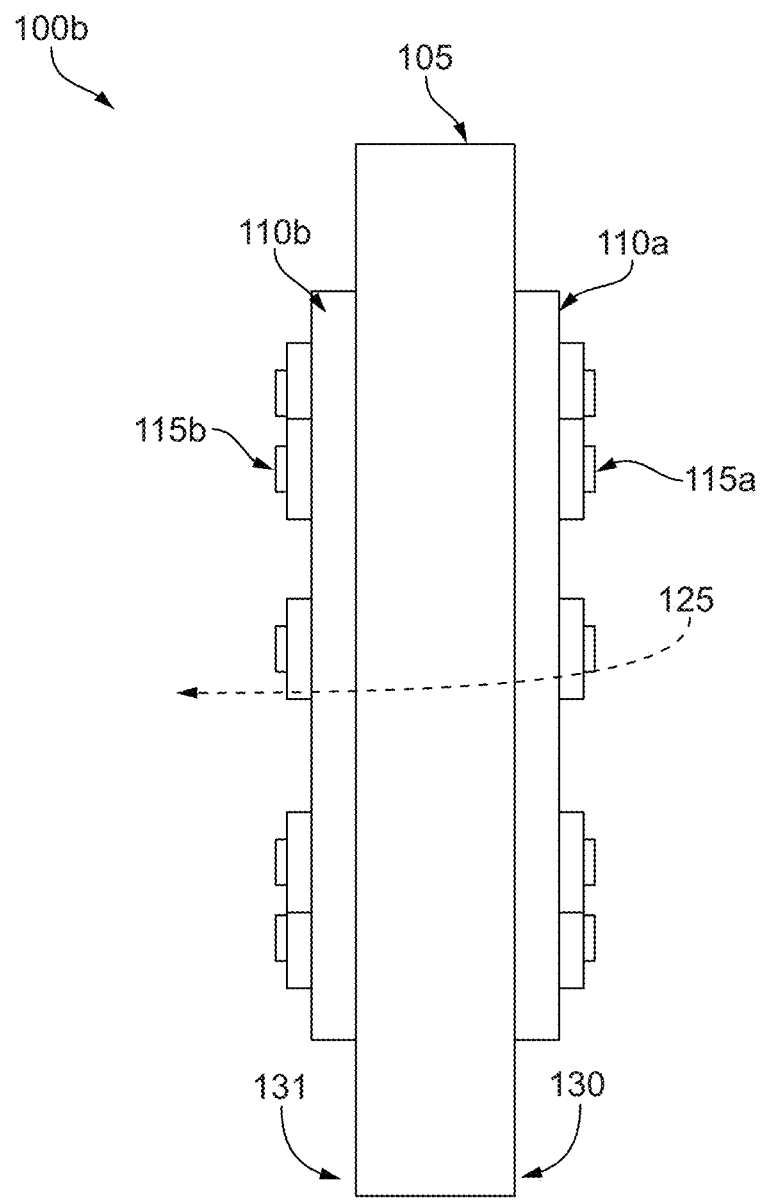
FIG. 3 is a side view of the lighting assembly illustrated in FIG. 1 according to another embodiment.
Figure 4:
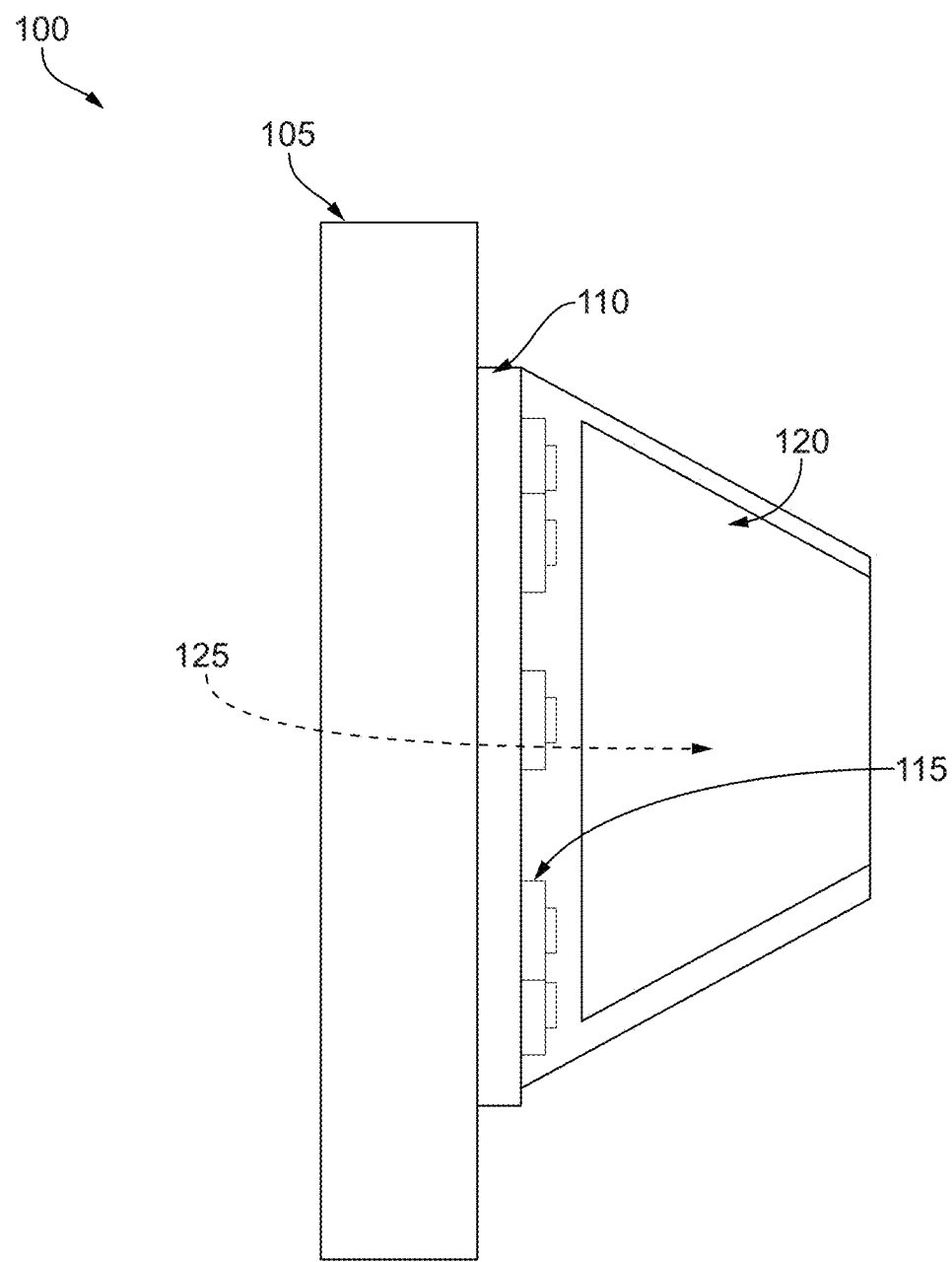
FIG. 4 is a side view of the lighting assembly illustrated in FIG. 1 according to another embodiment.

FIGS. 1-4 illustrate a luminaire, or lighting assembly, 100 that is configured to transmit High-Intensity Narrow Spectrum, or ultraviolet, light according to some embodiments of the application. The lighting assembly 100 may be, for example, a purpose-built solid-state lighting assembly configured to provide on-demand and/or continuous disinfectant light to an object being cleaned, such as a tube or other fluid carrying medium. The lighting assembly 100 may include a housing 105, a printed circuit board (PCB) 110, one or more light sources 115, and an optional optical system 120 (FIG. 4).

The housing 105 provides a mechanical base for lighting assembly 100 on which other components of the lighting assembly 100 are mounted. The housing 105 is illustrated as being generally rectangular in shape; however, it should be understood that the housing 105 may also be constructed to have a circular, elliptical, or other type of shape. The housing 105 may be constructed from plastic and/or thermally conductive materials (for example, aluminum alloys) such that housing 105 provides a heat sink for the heat dissipated by light sources 115 during operation of the lighting assembly 100.

The housing 105 further includes a hole, or opening, 125 formed in the housing 105. The opening 125 is sized and shaped to enable tubing and/or tubing couplings and connectors to pass through it. In some embodiments, the opening 125 is formed in the center of housing 105 such that it is fixed in size and position. In other embodiments, the opening 125 may have an adjustable size that is configurable to receive tubing and tubing connectors of varying shapes and sizes. For example, the opening 125 may be adjusted to receive tubing of a diameter that lies within in a predetermined range, such as 0.25-0.5 inches. In some embodiments, the housing 105 further includes a tool that is configured to remove undesirable coatings from tubing passing through opening 125 in the housing 105. In such embodiments, the tool may be implemented as a blade, or similar edge tool, that selectively protrudes from the inner periphery of the opening 125. Accordingly, the blade tool may be configured to strip or scrape undesirable coatings from tubing as it passes through opening 125 of the housing 105. In some embodiments, the inner periphery of the opening is lined with an abrasive material, such as sandpaper, that may be used to remove undesirable coatings from the tubing.

The housing 105 is configured to support a printed circuit board (PCB) 110 on which light sources 115 are mounted. In some embodiments, the PCB 110 may be annular in shape and positioned on the housing 105 such that an opening in the PCB 110 aligns with the opening 125 of the housing 105. Accordingly, the opening in PCB 110 is sized and shaped to enable the tubing and/or tubing couplings and connectors passing through opening 125 to pass through it as well. Although illustrated as being generally annular in shape, in other embodiments, the PCB 110 may take the form of any one of a variety of shapes (for example, a rectangle or trapezoid) that includes an opening configured to receive tubing and/or tubing connectors and couplings. In some embodiments, the PCB 110 does not include an opening.

The PCB 110 may be operatively coupled to a variety of components of lighting assembly 100, such as a controller having an electronic processor, a memory, a power supply, switching elements, and the one or more light sources 115. The controller may be configured to selectively provide power from the power supply to the one or more light sources 115 continuously, on an on-demand basis, on a scheduled basis, and/or in accordance with operation of a device in which the lighting assembly 100 is located. The controller may additionally be configured to adjust or alter the brightness, emission pattern, and/or temperature of the light emitted by light sources 115. In some embodiments, the power supply of lighting assembly 100 receives power from the device in which the lighting assembly is located. In other embodiments, the power supply may receive power directly from an AC source, such as a wall outlet, or directly from a DC source, such as a battery. The power supply may include a plurality of power converting elements such as AC/DC converters, DC/AC converters, AC/AC converters, and DC/DC converters.

In some embodiments, such as the illustrated embodiment of FIGS. 1-4, the one or more light sources 115 are surface mounted on PCB 110. In other embodiments, the one or more light sources 115 may be mounted directly on the housing 105 of lighting assembly 100. In some embodiments, the light sources 115 are configured to emit high-intensity narrow-spectrum light (HINS) having disinfectant and germicidal properties. In particular, the light sources 115 may be configured to emit 405 nanometer (nm) light that has significant antimicrobial properties with respect to a wide variety of bacterial and fungal pathogens that may be present in tubing and/or other fluid carrying mediums. In other embodiments, the light sources 115 may be configured to emit ultraviolet (UV) light. In some embodiments, the one or more light sources 115 may be implemented as, for example, light emitting diodes (LEDs) that are designed to emit 405 nm light. In some embodiments, the one or more light sources may be implemented as lasers, or laser diodes, capable of emitting 405 nm light. Although lighting assembly 100 is illustrated as including eight light sources 115, it should be understood that lighting assembly 100 may include any number of light sources 115 that is desirable (for example, one, two, ten, etc.)

FIG. 2 illustrates a side view of the lighting assembly 100. As shown in FIG. 2, the PCB 110 and, equivocally, light sources 115 may be mounted on a first surface 130 of the housing 105 of lighting assembly 100. Accordingly, during operation of the lighting assembly 100, the light sources 115 emit disinfectant HINS light that is projected in a generally outward direction with respect to the first surface 130. In some cases, it may be desirable for a lighting assembly 100 to be capable of emitting disinfectant HINS light in plurality of directions. Thus, as illustrated in FIG. 3, a lighting assembly 100b may include a first PCB 110a, a first set of light sources 115a, a second PCB 110b, and a second set of light sources 115a. The first PCB 110a and, equivocally, the first set of light sources 115a are mounted on the first surface 130 of housing 105 of the lighting assembly 100b. The second PCB 110b and, equivocally, the second set of light sources 115b are mounted on a second surface 131 of housing 105 of the lighting assembly 100b. Accordingly, during operation of the lighting assembly 100b, the first set of light sources 115a emit disinfectant HINS light that is projected in a generally outward direction with respect to the first surface 130, and the second set of light sources 115b emit disinfectant light that is projected in a generally outward direction with respect to the second surface 131. In some embodiments, additional light sources may be mounted on side surfaces of the lighting assembly 100.

In some embodiments, the light sources 115 may include built-in optical devices that are configured to direct the projection of disinfectant light emitted by the light sources 115 in a desired direction. In some embodiments, as illustrated in FIG. 4, the lighting assembly 100 includes optical system 120, which is configured to direct the projection of light emitted by light sources 115 in a desired direction. In particular, the optical system 120 is configured to optically couple the disinfectant HINS light emitted by the lights sources 115 to a tube or equivalent fluid transferring medium that is to be serviced by lighting assembly 100.

The optical system 120 may be mechanically coupled to the first surface 130 of the housing 105 in a position such that the optical system 120 protrudes outwards from the first surface 130 and guides or directs the disinfectant HINS light emitted by the light sources 115 towards a tube or equivalent fluid transferring medium being serviced by the lighting assembly 100. Although illustrated as having a generally conic shape, the optical system 120 may be implemented as any shape that is desirable for directing light in a desired direction. For example, in cases in which the optical system 120 is designed to bend light around a corner, the optical system 120 may be constructed as having an elbow shape.

The optical system 120 may be composed of a combination of optically transmissive materials, such as acrylic, and/or optically reflective materials, such as glass or aluminum. The optical system 120 may include optical features that are configured to facilitate the optical coupling of disinfectant HINS light emitted by the light sources 115 and a tube or equivalent fluid transferring medium being serviced by the lighting assembly 100. The optical features may be laser-engraved or otherwise manufactured features formed in surfaces of the optical system 120. For example, the optical features may be formed with injecting molding, vacuum forming, three-dimensional printing, application of a laminated film, embossing, engraving, etching, or the like. The optical features may be implemented in the optical system 120 in a uniform and/or non-uniform manner.

Figure 5:
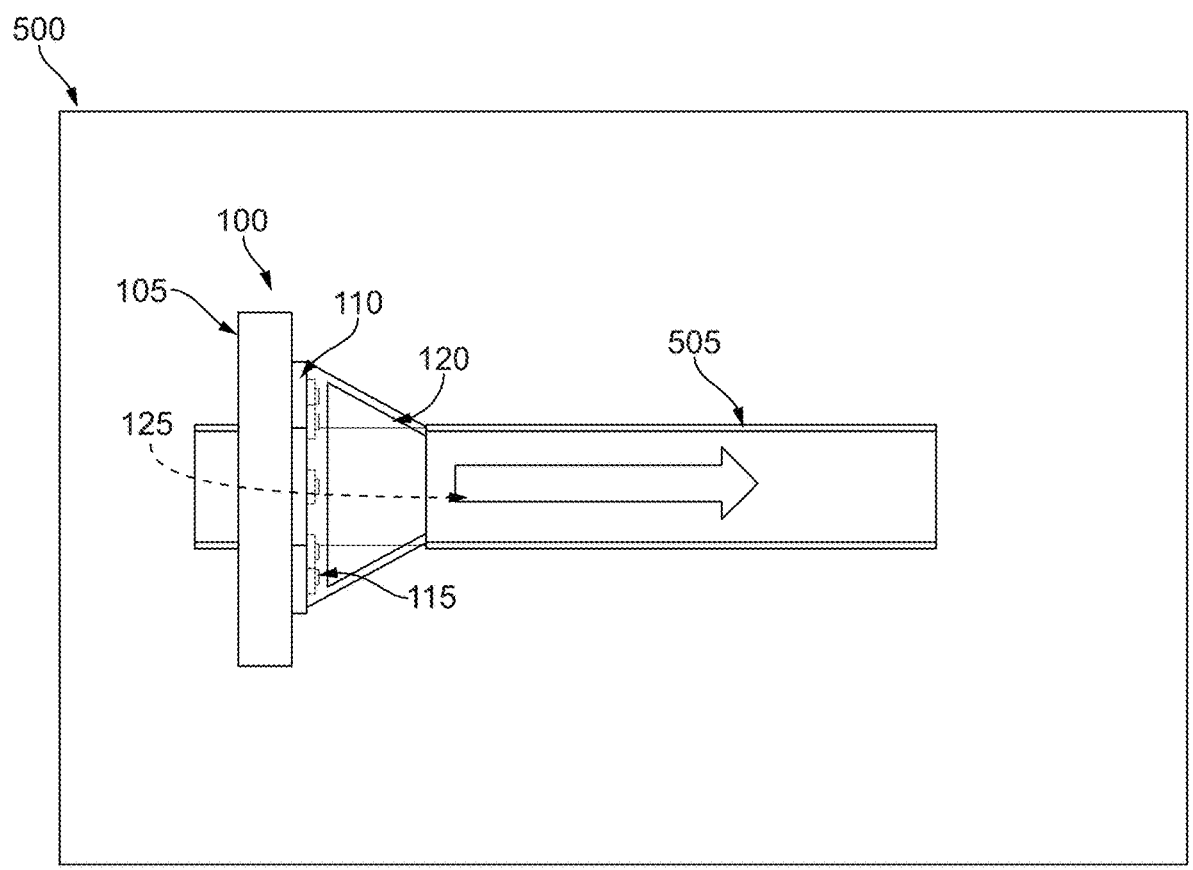
FIG. 5 is a block diagram of a system including the lighting assembly illustrated in FIG. 1 according to one embodiment.

FIG. 5 illustrates a system 500 in which a luminaire, such as lighting assembly 100, may be implemented. The system 500 may be, for example, a consumer or commercial device that utilizes tubing to transport liquids and/or gases intended for human exposure or consumption. Non-limiting examples of such consumer and commercial devices include, for example, coffee machines, ice machines, nebulizers, and vending machines. The tubing used in such devices may be susceptible to the development of harmful mold and bacteria, which may be inadvertently consumed by people using the devices. For example, the tubing in ice machines may be most susceptible to the growth of harmful mold and bacteria when residual amounts of standing water accumulate in the ice machine tubing. System 500 is illustrated as including a single lighting assembly 100 and a single tube 505; however, it should be understood that system 500 may include any number of tubes 505 and as many lighting assemblies 100 as are necessary to supply the tubes 505 with ample disinfectant HINS light.

In some embodiments, the system 500 is a newly manufactured device in which lighting assemblies 100 are installed at the time of manufacture. In other embodiments, the system 500 is an existing device that was retrofitted by installing lighting assemblies 100 after the time of manufacture. The lighting assembly 100 may be installed in the system 500 in any one of a variety of ways. For example, in some embodiments, the lighting assembly 100 may be fixedly secured to a coupling of the tube 505 such that the coupling of the tube 505 protrudes through and forms a friction fit with opening 125 of the housing 105 of lighting assembly 100. In a similar manner, the lighting assembly 100 may be fixedly secured directly to the tube 505 such that tube 505 protrudes through and forms a friction fit with opening 125 of the housing 105 of lighting assembly 100. In some embodiments, the lighting assembly 100 may be installed in the system 500 such that the housing 105 of the lighting assembly 100 is mechanically coupled to components of the system 500. For example, the housing 105 of the lighting assembly 100 may be fixedly secured to an interior structure, such as a wall or beam, of the system 500 via screws, hooks, and/or any other appropriate type of mechanical fastener.

The tube 505 of system 500 is illustrated as passing through the opening 125 in the housing 105 of lighting assembly 100; however, as explained above, in some embodiments a coupling or connector device for the tube 505 may alternatively pass through the opening 125. In some embodiments, the tube 505 may constructed from a material that is translucent to and capable of transmitting disinfectant HINS light, such as 405 nm light, throughout its length. For example, the tube 505 may be constructed from translucent plastics, such as polyethylene, and/or glass. In some embodiments in which the tube 505 is constructed from translucent materials, an additional sheathing may be added to an interior and/or exterior surface of the tube 505 that is designed to enhance the ability of tube 505 to reflect and/or transmit disinfectant HINS light, such as 405 nm light, throughout its length. The sheathing may include, for example, serrations, engravings, and/or similar optical features designed to enhance the ability of the tube 505 to reflect and/or enable travel of disinfectant HINS light throughout its length.

In some embodiments of the system 500, such as embodiments in which the system 500 is a preexisting device, the tube 505 may be constructed from transparent materials such as clear plastic or glass that are incapable of reflecting and/or transmitting disinfectant HINS light through its length. In such embodiments, a sheathing and/or reflective coating may be applied to the interior and/or exterior surface of the tube 505 such that tube 505 is enabled to reflect and/or transmit disinfectant HINS light through its length. In some embodiments, the tube 505 may include an opaque coating that prevents the tube 505 from being optically coupled to the lighting assembly 100. In such embodiments, the specialized tool that is optionally included in the lighting assembly 100 may be used to remove the opaque coating from the tube 505. Accordingly, a sheathing and/or reflective coating may then be applied to the interior and/or exterior surface of the tube 505 such that tube 505 is enabled to reflect and/or enable the travel of disinfectant HINS light throughout its length.

During operation of the lighting assembly 100 installed in system 500, the controller of the lighting assembly 100 selectively supplies power to the light sources 115. When the controller of lighting assembly 100 delivers power to the light sources 115, the light sources 115 emit disinfectant HINS light, such as 405 nm light. The optical system 120 of lighting assembly 100 optically couples the disinfectant HINS light that is emitted by light sources 115 to the tube 505 such that the emitted disinfectant HINS light is projected into and through the tube 505. As the emitted disinfectant HINS light is projected into the tube 505 by optical system 120, the disinfectant HINS light travels through the tube 505, such as in a manner that is similar to the manner in which light travels through an fiber optic cable. Accordingly, the disinfectant HINS light traveling through the tube 505 actively kills existing and prevents the growth of new mold and bacteria inside the tube 505.

As described above, the optical system 120 is configured to guide the projected disinfectant HINS light into the tube 505. In addition to the optical system 120, the tube 505 itself may utilize edge lighting or wave guide principles to direct the disinfectant HINS light through an outer surface of and into the tube 505. When there are no contaminants present on a surface of or within the tube 505, the disinfectant HINS light passes through the material of the tube 505 and travels through the length of the tube 505 as described above. However, when a contaminant is present on a surface of or within the tube 505, the contaminant may alter the optical properties on the surface of the tube 505. When the optical properties on the surface of the tube 505 are altered by a contaminant, the disinfectant HINS light is directed to bombard, or otherwise concentrate its direction of travel towards, the contaminant until the contaminant is eliminated from the surface of tube 505 by the disinfectant HINS light. Accordingly, the utilization of edge lighting or wave guide principles enables the disinfectant HINS light projected by light sources 115 to automatically target the contaminant.

In some embodiments, the controller of lighting assembly 100 continuously provides power from the power supply to the light sources 115. In such embodiments, the lighting assembly 100 provides continuous disinfectant HINS light to the tube 505. In some embodiments, the controller of lighting assembly 100 provides power from the power supply to the light sources 115 when fluid is not flowing through tube 505. For example, in the case in which system 500 is an ice machine, the controller of lighting assembly 100 may activate the light sources 115 at times in which water is not flowing through the tube 505. In other embodiments, the controller of lighting assembly 100 may be configured to activate the light sources 115 even when fluid is flowing through the tube 505, for the fluid in the tube 505 may aid in the transmission of disinfectant HINS light throughout the tube 505. In some embodiments, the controller may activate the light sources 115 on a scheduled basis. For example, the controller may be configured to repeatedly activate the light sources 115 for fifty-five minutes and deactivate the light sources 115 for five minutes.

In some systems, more than one lighting assembly 100 may be desired to provide ample disinfectant HINS light throughout the entire length of tubing in the system. For example, a tube's ability to transmit disinfectant HINS light may vary with the material composition, size, and shape of the tube. Moreover, in systems in which the tubing has poor optical qualities, disinfectant HINS light may emitted from the light sources 115 of a lighting assembly 100 may leak out of the tubing as it travels through the tubing.

Figure 6:
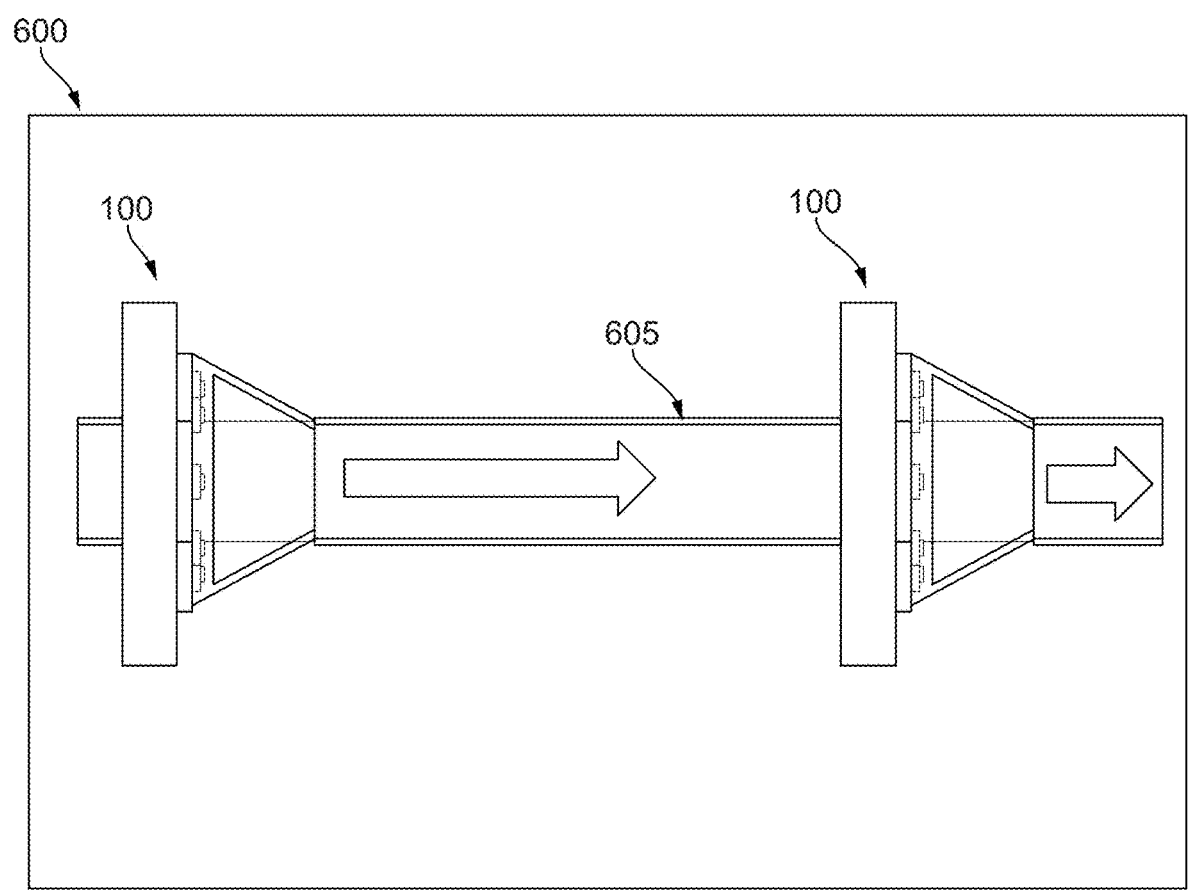
FIG. 6 is a block diagram of a system including more than one of the lighting assembly illustrated in FIG. 1 according to one embodiment.

Accordingly, FIG. 6 illustrates a system 600 in which serial lighting assemblies 100 are installed and configured to emit disinfectant HINS light to a tube 605. The lighting assemblies 100 operate in the same manner as described above with respect to system 500; however, the multiple lighting assemblies 100 may be capable of transmitting disinfectant HINS light throughout the entire length of tube 605 with a more consistent intensity. For example, if the tube 605 of system 600 is composed of a material from which disinfectant HINS light escapes as it travels through the tube 605, additional lighting assemblies 100 that are positioned along the length of tube 605 provide additional disinfectant HINS light to the tube 605 to supplement disinfectant HINS light lost to leakage. In some embodiments, the serial lighting assemblies 100 may be positioned along the length of tube 605 in evenly spaced intervals, such at eighteen inch intervals. In some embodiments, additional lighting assemblies 100 may be positioned at points on the tube 605 in which disinfectant HINS light is more likely to leak from the tube 605. For example, additional lighting assemblies 100 may be placed immediately in front of and/or behind a bend in the tube 605. Similarly, additional lighting assemblies 100 may be placed on either side of a connector or coupling of tube 605.

Figure 7:
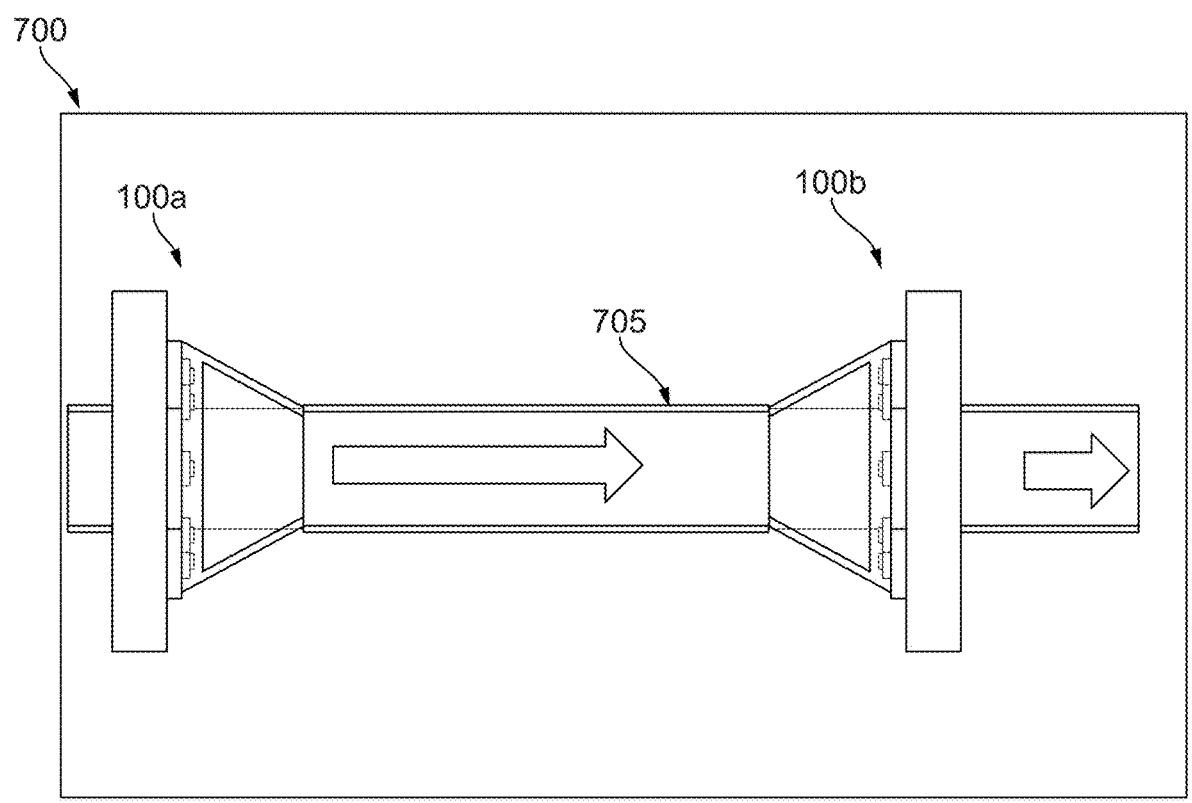
FIG. 7 is a block diagram of a system including more than one of the lighting assembly illustrated in FIG. 1 according to another embodiment.

In some systems, such as system 700 illustrated in FIG. 7, serial lighting assemblies 100*a* and 100*b* may be installed on a tube 705 such that they emit disinfectant HINS light in opposing directions. Accordingly, the disinfectant HINS light emitted from lighting assembly 100*a* is projected through the tube 705 in a direction from left to right, and the disinfectant HINS light emitted from lighting assembly 100*b* is projected through the tube 705 in a direction from right to left. In some systems, the lighting assembly 100*b* illustrated in FIG. 3 may be installed to provide disinfectant HINS light to tubing in opposing directions.

Figure 8:
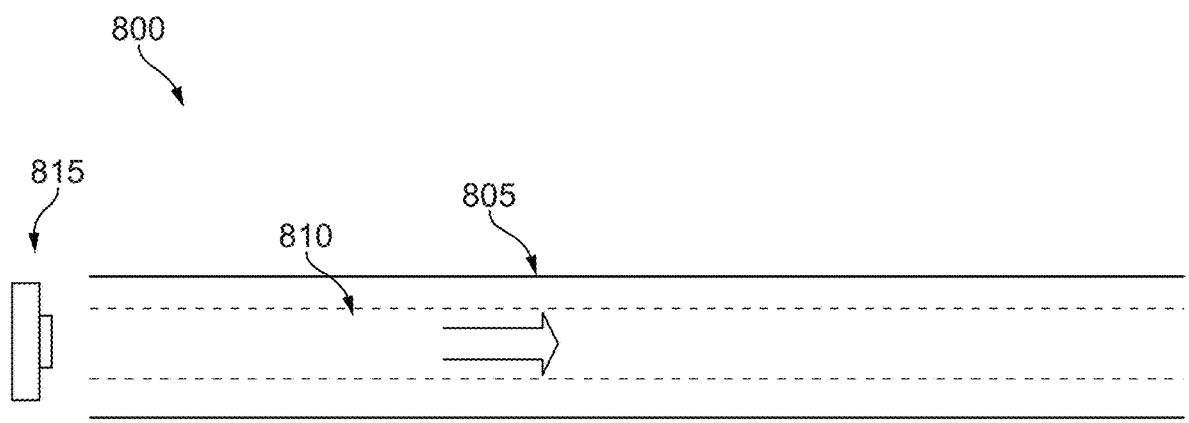
FIG. 8 is a block diagram of an antimicrobial system including a fiber optic cable according to one embodiment.

FIG. 8 illustrates an alternative embodiment of a system 800 designed to provide disinfectant HINS light to tubing utilized by consumer and/or commercial devices to transport liquids and/or gases intended for human exposure or consumption. System 800 includes a tube 805 that is configured to transport liquids and/or gases intended for human exposure or consumption, a fiber optic cable 810, and a light source 815. The fiber optic cable 810 may be installed inside of the tube 805 such that it extends throughout the length of the tube 805. The light source 115 is configured to project disinfectant HINS light into the fiber optic cable 810 such that the fiber optic cable 810 transmits the disinfectant HINS light throughout the length of tube 805, providing active disinfection of existing and prevention of the growth of new mold and bacteria inside the tube 805.

In some embodiments, the light source 815 may be a standalone light source 815 operatively coupled to a controller that is configured to selectively active the light source 815 to emit disinfectant HINS light, such as 405 nm light, into the fiber optic cable 810. The standalone light source 815 may be implemented as, for example, an LED, a laser, a laser diode, or any other suitable solid-state light source capable of emitting disinfectant HINS light. In a similar manner as described above, the controller that is operatively connected to standalone light source 815 may be configured to activate the standalone light source 815 continuously, when fluid is not flowing through the tube 815, when fluid is flowing through the tube 815, on a regularly scheduled basis, or for any other period of time that is desirable.

Figure 9:
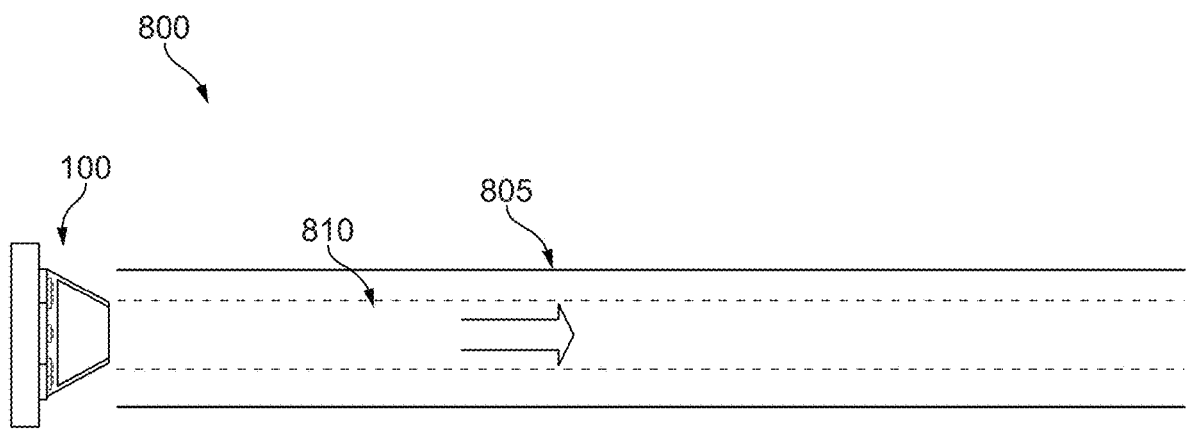
FIG. 9 is a block diagram of an antimicrobial system including a fiber optic cable according to another embodiment.

In other embodiments of the system 800, such as the embodiment illustrated in FIG. 9, the light source 815 may be implemented as the lighting assembly 100 from the embodiments described above. In such embodiments, when the controller of lighting assembly 100 activates the light sources 115 to emit disinfectant HINS light, the optical system 120 guides the emitted disinfectant HINS light into the fiber optic cable 810. Accordingly, the disinfectant HINS light emitted by the light sources 115 travels through the fiber optic cable 810 and actively disinfects existing and prevents the growth of new mold and bacteria in the tube 805.

Figure 10:
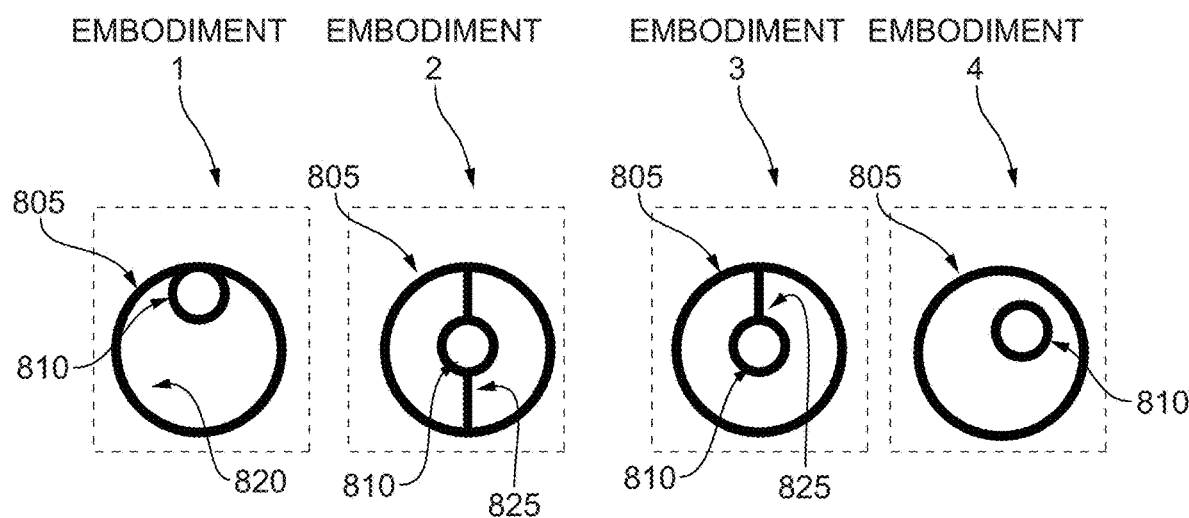
FIG. 10 is a front view of an antimicrobial system including a fiber optic cable according to some embodiments.

FIG. 10 illustrates a variety of non-limiting example embodiments for installing a fiber optic cable 810 in a tube 805. For example, as illustrated by embodiment 1 of FIG. 10, the fiber optic cable 810 may be installed in tube 805 such that it is fixed to an interior wall 820 of the tube 805. In such embodiments, the fiber optic cable 810 may extend eccentrically through the tube 805 such that the center of optic fiber cable 810*a* does not align with the center of tube 805. As illustrated by embodiment 2 of FIG. 10, the fiber optic cable 810 may be installed in the tube 805 such that it is held in place by a plurality of supporting members 825 that extend from the interior wall of tube 805. Although illustrated as there being two supporting members 825 that hold the fiber optic cable in place in embodiment 2, in some embodiments, there may be more or less than two supporting members 825 holding the fiber optic cable 810 in place. For example, as illustrated by embodiment 3 of FIG. 10, there may be only one supporting member 825 that holds the fiber optic cable 810 in place. In some embodiments, such as embodiment 4 illustrated in FIG. 10, the fiber optic cable 810 is installed such that it is free floating within the tube 805.

What is claimed is:

1. A system comprising:
    a tube for transferring fluid;
    a fiber optic cable that extends through an interior of the tube; and
    a lighting assembly including,
      a housing,
      a printed circuit board (PCB) mounted on a first surface of the housing, and
      one or more light sources mounted on the PCB, the one or more light sources configured to project high intensity narrow spectrum light into the fiber optic cable.

2. The system of claim 1, wherein the fiber optic cable is free floating within the interior of the tube.

3. The system of claim 1, wherein the fiber optic cable is supported by a supporting member extending from an interior surface of the tube.

4. The system of claim 1, wherein the fiber optic cable is supported by a plurality of supporting members extending from an interior surface of the tube.

5. The system of claim 1, wherein the fiber optic cable extends eccentrically through the tube such that a center of the fiber optic cable does not align with a center of the tube.

6. The system of claim 1, wherein the fiber optic cable is fixed to an interior wall of the tube.

7. The system of claim 1, wherein the PCB has an opening aligned with the tube and the one or more light sources are arranged on the PCB along an outer perimeter of the opening.

8. The system of claim 1, wherein the lighting assembly further includes an optical system configured to direct light emitted by the one or more light sources to the fiber optic cable.

9. The system of claim 8, wherein the optical system has a conic shape extending from the housing toward the fiber optic cable.

10. The system of claim 8, wherein the optical system includes surface features for directing light.

11. The system of claim 1, further comprising a controller configured to selectively provide power from a power supply to the one or more light sources.

12. A system comprising:
a tube for transferring fluid;
a fiber optic cable that extends through an interior of the tube; and
a lighting assembly including,
a housing,
a printed circuit board (PCB) mounted on a first surface of the housing,
one or more light sources mounted on the PCB, the one or more light sources configured to emit high intensity narrow spectrum light into the fiber optic cable, and
an optical system configured to optically couple light emitted by the one or more light sources to the fiber optic cable.

13. The system of claim 12, wherein the fiber optic cable is free floating within the interior of the tube.

14. The system of claim 12, wherein the optical system has a conic shape extending from the housing toward the fiber optic cable.

15. The system of claim 12, wherein the optical system includes surface features for directing light.

16. A system comprising:
a tube for transferring fluid;
a fiber optic cable that extends through an interior of the tube; and
a lighting assembly including,
a housing,
a printed circuit board (PCB) mounted on a first surface of the housing,
one or more light sources mounted on the PCB, the one or more light sources configured to emit high intensity narrow spectrum light into the fiber optic cable, and
a controller configured to selectively provide power from the power supply to the one or more light emitters.

17. The system of claim 16, wherein the controller is configured to alter the brightness of the one or more light emitters.

18. The system of claim 17, wherein the controller is configured to alter an emission pattern of the one or more light emitters.

19. The system of claim 17, wherein the controller is configured to provide power to the one or more light emitters when fluid is not flowing through the tube.

20. The system of claim 17, wherein the controller is configured to provide power to the one or more light emitters on a scheduled basis.

* * * * *